United States Patent
Newman

(10) Patent No.: US 9,476,402 B2
(45) Date of Patent: *Oct. 25, 2016

(54) PRESSURIZED SOLAR POWER SYSTEM

(75) Inventor: Michael Newman, Jacksonville, FL (US)

(73) Assignee: U S MICROPOWER INC, Jacksonville, FL (US)

( * ) Notice: Subject to any disclaimer, the term of this patent is extended or adjusted under 35 U.S.C. 154(b) by 184 days.

This patent is subject to a terminal disclaimer.

(21) Appl. No.: 12/870,202

(22) Filed: Aug. 27, 2010

(65) Prior Publication Data

US 2011/0048408 A1   Mar. 3, 2011

Related U.S. Application Data

(60) Provisional application No. 61/237,769, filed on Aug. 28, 2009.

(51) Int. Cl.
*F03B 17/00* (2006.01)
*F24J 2/07* (2006.01)

(52) U.S. Cl.
CPC ............... *F03B 17/00* (2013.01); *F24J 2/07* (2013.01); *Y02E 10/41* (2013.01); *Y02E 10/46* (2013.01)

(58) Field of Classification Search
USPC ......................................... 60/641.8–641.15
See application file for complete search history.

(56) References Cited

U.S. PATENT DOCUMENTS

| | | | |
|---|---|---|---|
| 4,010,732 A * | 3/1977 | Sawata et al. | 126/688 |
| 4,055,948 A * | 11/1977 | Kraus et al. | 60/641.8 |
| 4,079,591 A | 3/1978 | Derby et al. | |
| 4,164,123 A | 8/1979 | Smith | |
| 4,192,144 A * | 3/1980 | Pierce | 60/641.8 |
| 4,213,563 A * | 7/1980 | van Kuijk | 237/2 B |
| 4,455,826 A | 6/1984 | Knoos | |
| 5,685,151 A | 11/1997 | Ross | |
| 6,233,914 B1 | 5/2001 | Fisher | |
| 7,003,955 B2 | 2/2006 | Davis | |
| 7,185,493 B1 | 3/2007 | Connelly | |
| 7,304,899 B2 * | 12/2007 | Gerstmeier et al. | 365/200 |
| 7,340,899 B1 * | 3/2008 | Rubak et al. | 60/641.8 |
| 2002/0153004 A1 | 10/2002 | Agata | |
| 2009/0101138 A1 | 4/2009 | Eck et al. | |
| 2009/0158736 A1 | 6/2009 | Mierisch | |
| 2009/0199557 A1 | 8/2009 | Bennett | |
| 2010/0083952 A1 * | 4/2010 | van Houten | 126/678 |
| 2011/0036091 A1 * | 2/2011 | Waterstripe et al. | 60/643 |
| 2011/0168355 A1 * | 7/2011 | Nayak et al. | 165/104.19 |
| 2011/0277470 A1 * | 11/2011 | Benyaminy et al. | 60/641.8 |
| 2012/0244017 A1 * | 9/2012 | Lin | 417/207 |

OTHER PUBLICATIONS

Westinghouse Technical Manual, 1990.*

* cited by examiner

*Primary Examiner* — Kenneth Bomberg
*Assistant Examiner* — Wesley Harris
(74) *Attorney, Agent, or Firm* — Smith Gambrell & Russell LLP

(57) ABSTRACT

Systems and methods for generating electrical power using a solar power system comprising pressurized pipes for transporting liquid water. The pressurized pipes flow through solar collectors which concentrate sunlight on the water flowing through the pipes. The pressurization in the pipes allows for the water flowing therethrough to absorb large quantities of energy. The pressurized and heated water is then pumped to a heat exchanger where the thermal energy is released to produce steam for powering a steam turbine electrical generator. Thereafter, the water is returned to the solar collectors in a closed loop to repeat the process.

22 Claims, 5 Drawing Sheets

FIGURE 1. PRESSURIZED WATER SOLAR STEAM PRODUCTION SYSTEM

FIGURE 2. SIMPLE PRESSURIZED WATER SOLAR THERMAL POWER SYSTEM

FIGURE 3. COMBINED CYCLE ELECTRIC GENERATING PLANT EMBODIMENT OF THE PRESENT INVENTION

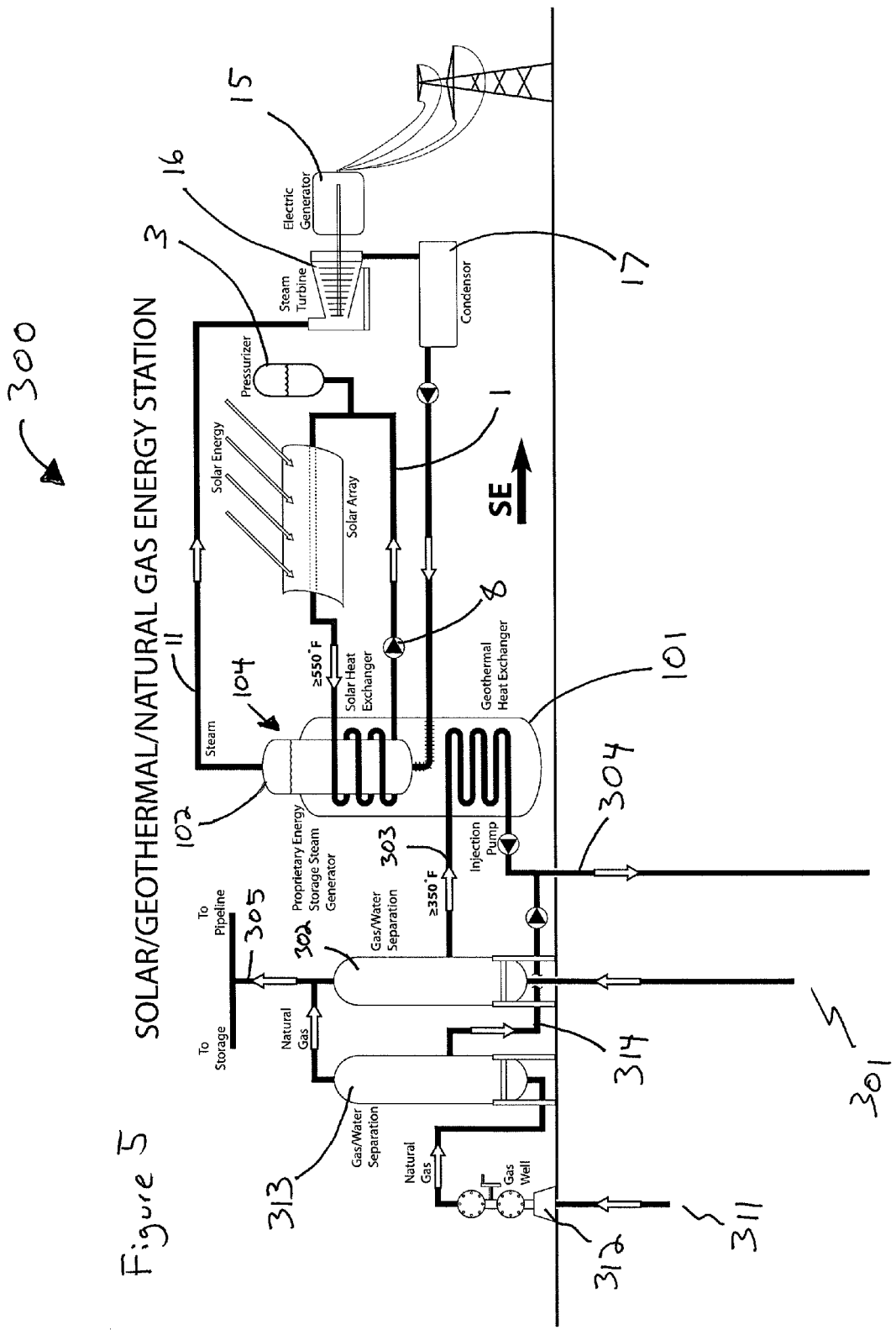

PRESSURIZED SOLAR POWER SYSTEM

CROSS-REFERENCE TO RELATED APPLICATIONS

This application claims priority to U.S. provisional application No. 61/237,769, filed Aug. 28, 2009, which is incorporated herein by reference.

BACKGROUND OF THE INVENTION

Large scale solar power plants utilizing concentrating solar power ("CSP") technology have been in production for over twenty years. The Solar Electric Generating Systems ("SEGS") facilities in the Mojave Desert of California are a well-known example of solar power plants using such CSP technology. Concentrating solar power utilizes solar collectors comprising large mirrors or lenses which concentrate solar energy upon an unpressurized pipe or tube that contains a heat transfer fluid. Typically, a synthetic oil having a high boiling point is used as the heat transfer fluid. For example, the SEGS facilities utilize Therminol® from Solutia, Inc. as the heat transfer fluid.

As the heat transfer fluid flows through the unpressurized pipe inside the solar collectors, it is heated by the incident sunlight. One or more pumps are situated along the pipe to pump the fluid through the solar collectors and towards a boiler or heat exchanger. There, the transfer fluid is used to heat water in the boiler to produce steam. The steam is then used for powering a conventional steam turbine to produce electricity. After the heat transfer fluid releases its thermal energy in the boiler/heat exchanger, the heat transfer fluid is pumped back to the solar collectors to be heated once again.

One disadvantage of the use of a synthetic heat transfer fluid is that the fluid has a relatively low energy density. For example, Therminol® has an energy density of approximately 2100 J/kg° C. whereas ordinary water has an energy density of approximately 4200 J/kg° C. This relatively low energy density for Therminol® means that it can carry relatively less thermal energy from the solar collectors to the heat exchanger than water.

Another disadvantage of synthetic heat transfer fluids is that they are often flammable. As a result, care must be taken in handling the fluids and they must be prevented from overheating.

For these and other reasons, a number of solar power systems have recently been developed to produce steam directly from water rather than using a synthetic heat transfer fluid. Such systems—dubbed Direct Solar Steam generation ("DISS") or Direct Steam Generation ("DSG")—distribute water through the unpressurized pipes in the solar collectors rather than distributing a synthetic heat transfer fluid. Because water has a much lower boiling point than a synthetic heat transfer fluid, the water will eventually turn to steam after being heated a sufficient amount. Thereafter, the steam is directed to a steam turbine for generating electricity.

Such DSG systems have their own drawbacks, however. First, the presence of steam in the pipes of the solar collectors reduces the efficiency of the collectors because steam has a significantly lower heat capacity than water. Thus, the steam can carry less thermal energy towards the turbine than can pressurized water. Second, the use of a two-phase (water/steam) flow within the pipes of the solar collectors creates a condition known as the Ledinegg Instability. This phenomenon results in a boiling front as the water moves through the pipes and flashes over to steam. To compensate for this instability, an undesirable pressure drop must be introduced into the system. Finally, DSG systems are more sensitive to variations in solar flux density and changes in atmospheric conditions because the systems will not function properly unless the water in the solar collectors is sufficiently heated to flash over to steam. Taken together, these drawbacks necessitate the use of larger, more expensive solar collectors to produce a given amount of electricity. Therefore, such DSG systems may have little or no cost savings in comparison to traditional CSP systems containing synthetic heat transfer fluid.

SUMMARY OF THE INVENTION

Disclosed herein are systems and methods for generating electrical power using a solar power system comprising pressurized pipes for transporting liquid water. The pressurized pipes flow through solar collectors which concentrate sunlight on the water flowing through said pipes. Because the pipes inside the solar collectors are pressurized, the water flowing therethrough can be heated well above the ordinary boiling point of water (100° C.). Advantageously, the systems and methods described herein rely upon the superior heat transfer capabilities of water in comparison to synthetic heat transfer fluids. Furthermore, the lack of synthetic heat transfer fluid minimizes the added costs and safety concerns associated with the use of such fluids.

Finally, the pressurized pipes described herein prevent the water flowing therethrough from flashing over to steam when heated to a high temperature. Accordingly, the instabilities and unwanted pressure drops associated with two-phase (water/steam) flow are eliminated. Furthermore, the use of water rather than steam for transporting thermal energy takes advantage of water's superior energy carrying capacity in comparison to steam.

BRIEF DESCRIPTION OF THE DRAWINGS

FIG. 5 shows a view of a third embodiment of a pressurized solar power system.

DETAILED DESCRIPTION

Figure 1:
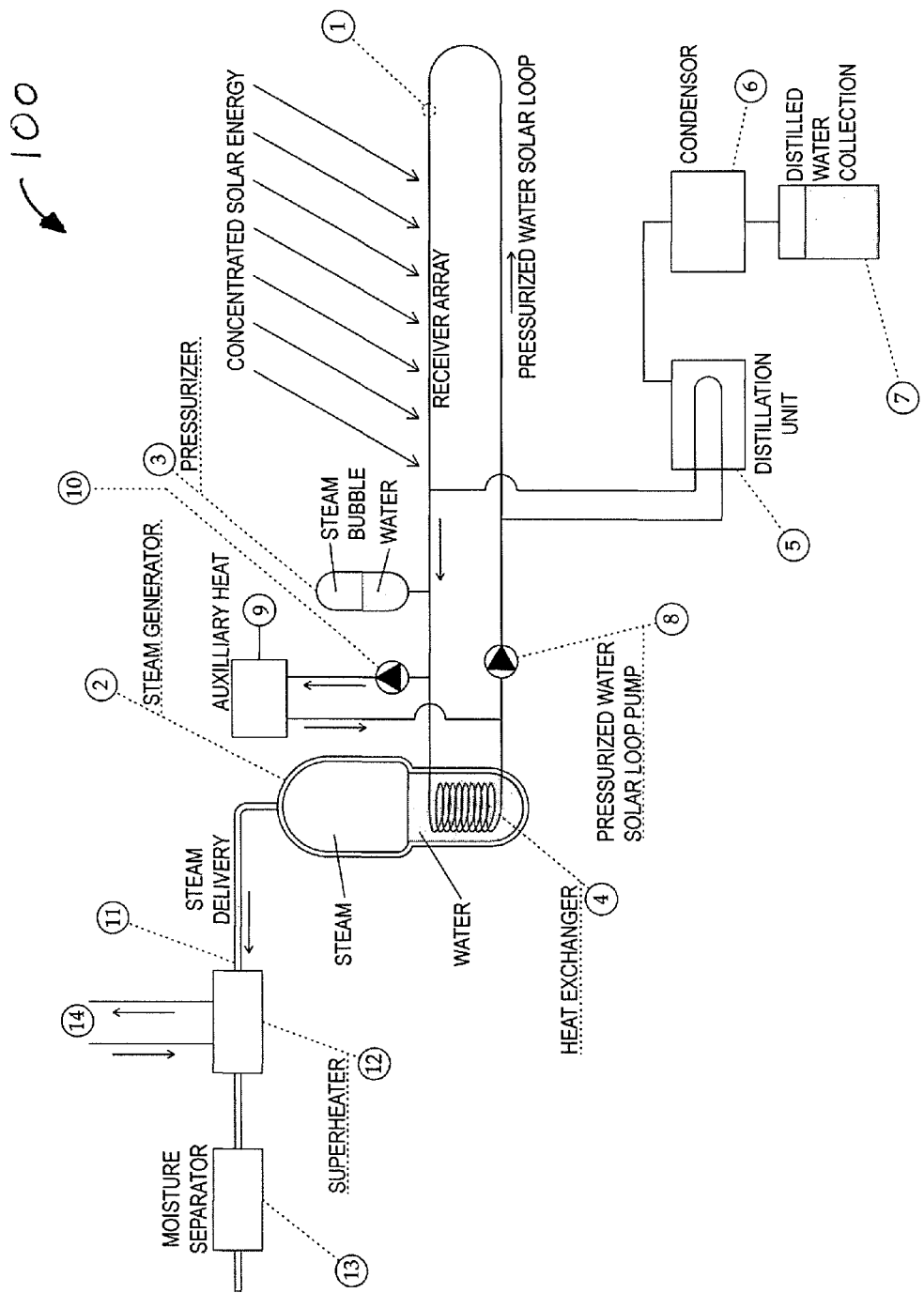
FIG. 1 shows a detailed view of a pressurized solar power system according to one embodiment of the present invention.

FIGS. 1-4 show various embodiments and aspects of the present invention, with like reference numerals indicating like parts throughout the several views.

FIG. 1 shows a detailed view of a pressurized solar power system 100 in accordance with one embodiment of the present invention. A pressurized solar loop 1 comprising a hollow pipe or tube is present. A portion of the pressurized solar loop 1 is positioned within a solar collector receiver array (not pictured). The solar collector receiver array may comprise any suitable means of concentrating solar energy on the pressurized solar loop 1 including, but not limited to, parabolic troughs, parabolic dishes, compact linear Fresnel reflectors, linear Fresnel reflectors, compound parabolic collectors, two axis tracking systems that focus solar energy on a tower or other structure, and any other solar energy concentration system.

The pressurized solar loop 1 forms a closed loop and preferably contains water within the loop. Other suitable heat transfer fluids known to those skilled in the art may be used instead of water, however. A pressurizer 3 is attached to the pressurized solar loop 1 to pressurize the solar loop 1 above normal atmospheric pressure.

Preferably, pressurizer 3 is a steam bubble pressurizer comprising a large internal chamber where steam can form in the upper section of the chamber but cannot be released. As the water in the solar loop 1 is heated due to the concentrated sunlight directed towards solar loop 1, a steam bubble will form in the upper portion of steam bubble pressurizer 3. The steam bubble can also be formed by pre-heating the water in solar loop 1. After forming, the steam bubble in the upper section of the pressurizer 3 keeps pressure on the water in the pressurized solar loop 1. Advantageously, this pressure increases the boiling point of the water in the pressurized solar loop 1, thus preventing the water from flashing over to steam. As solar energy increases the temperature of water circulating in solar loop 1, the steam bubble in the pressurizer 3 increases in pressure thereby creating a self-regulating pressure control system.

As described above, the use of a single-phase (water only) pressurized solar loop 1 prevents Ledinegg Instability and unwanted pressure drop. Water also has an increased energy carrying capacity in comparison to steam. Thus, the pressurized water in pressurized solar loop 1 can carry more energy than a comparable DSG system with a two-phase (water/steam) energy transport mechanism.

One or more pumps 8 are present along the pressurized solar loop 1. These pumps 8 act to circulate water through the solar collector receiver array and to the heat exchanger 4. Control mechanisms known to those skilled in the art operate to control the pumps 8 and the flow rate of water flowing through pressurized solar loop 1.

An auxiliary heating device 9 can be attached to pressurized solar loop 1, preferably near the point where the pressurized solar loop 1 enters the heat exchanger 4. One or more pumps 10 can be provided to pump water from the solar loop 1 into the auxiliary heating device 9. The auxiliary heating device 9 can be used to heat the water in the solar loop 1 if there is insufficient solar energy to heat the water to an appropriate operating temperature such as on cloudy days or during the nighttime hours.

In some embodiments, an optional distillation unit 5, condenser 6, and water collector 7 can be connected to the pressurized solar loop 1. The distillation unit 5 can use the hot water from the pressurized solar loop 1 to boil water to create steam. This steam can then be transferred to condenser 6 where it will be cooled and condensed into clean distilled water. Such distilled water can be collected in water collector 7. The distilled water can later be used for any number of purposes including, but not limited to, providing makeup water for the heat exchanger 4 or the pressurized solar loop 1.

After the water is heated in the portion of pressurized solar loop 1 that lies inside the solar collectors, the water travels to the heat exchanger 4. The heat exchanger 4 preferably comprises a pressurized steam generator vessel 2 with liquid water in the lower portion of the steam generator vessel 2. Preferably, the pressurized solar loop 1 will enter the lower portion of the steam generator vessel 2. A sizeable length of solar loop 1 will be present within the lower portion of the steam generator vessel 2, preferably in a coil, loop, or other configuration so as to expose a substantial surface area of the solar loop 1 to the water contained in the lower portion of heat exchanger 4. The hot water contained in solar loop 1 will transfer its heat to the water in the bottom of heat exchanger 4 thus causing the water in the heat exchanger 4 to boil and produce steam. The steam generator vessel 2 of heat exchanger 4 preferably comprises suitable ports or openings for releasing steam and for introducing makeup water into the heat exchanger 4. Preferably, the makeup water is cooler than the water present in the pressurized solar loop 1 so as to facilitate the transfer of thermal energy inside the heat exchanger 4. As described in more detail below, cooling towers or other means for cooling water can be used to sufficiently cool water for use as makeup water.

After the hot water in the pressurized solar loop 1 transfers its thermal energy to create steam inside the heat exchanger 4, the cooled water exits the heat exchanger 4 and returns to the solar collectors. In such a manner, the water inside pressurized solar loop 1 continuously circulates through solar loop 1, absorbing thermal energy from the sunlight at the solar collectors and releasing thermal energy inside the heat exchanger 4.

Figure 2:
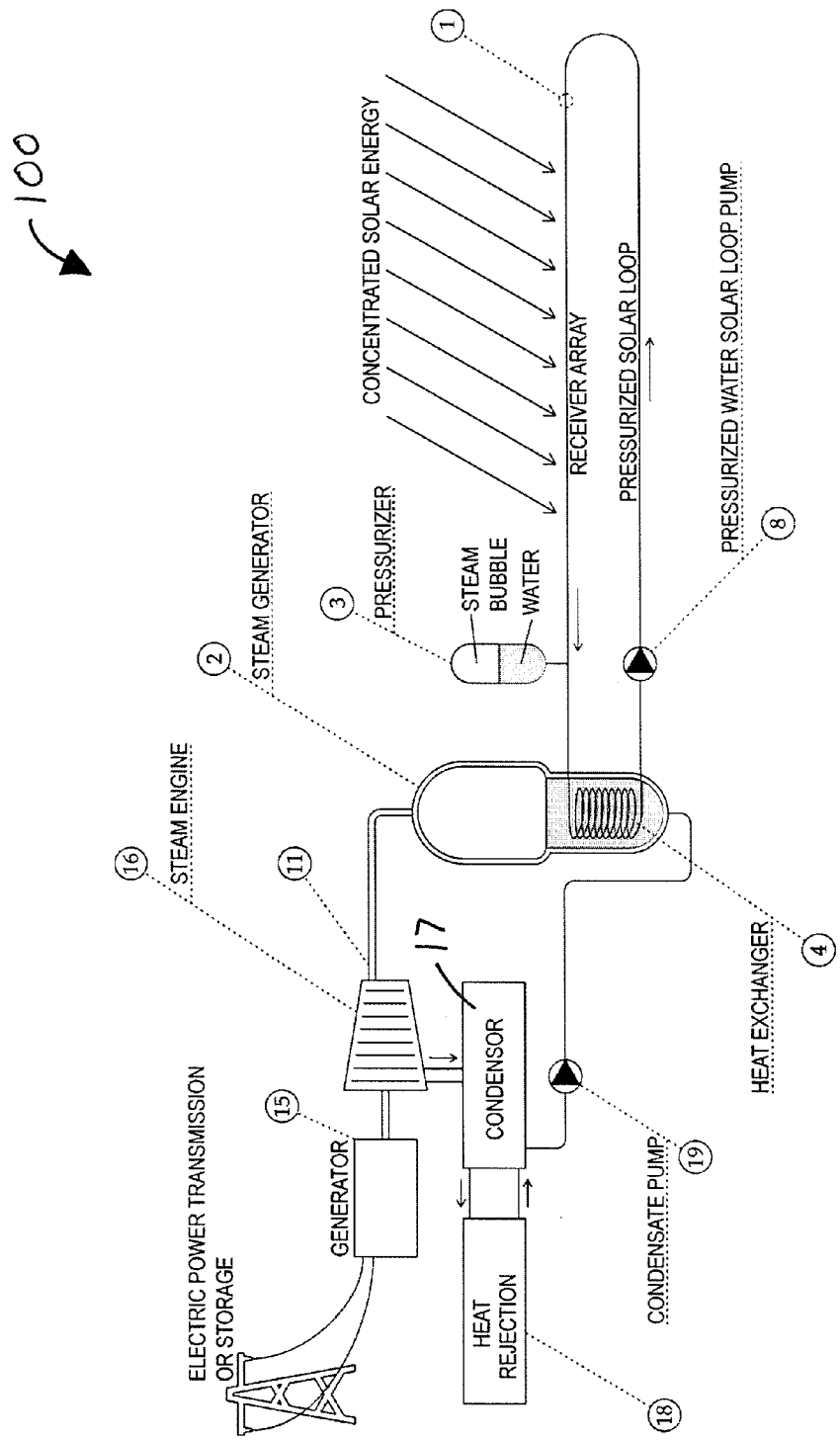
FIG. 2 shows a view of the embodiment of FIG. 1 including the steam turbine and power generation portion of the system.

With reference to FIGS. 1 and 2, the steam produced inside heat exchanger 4 exits the steam generator vessel 2 and proceeds through steam piping 11 towards a steam turbine 16. As known to those skilled in the art, the steam turbine 16 utilizes the energy contained in the steam to generate rotary motion. This motion, in turn, is used by generator 15 to produce electricity.

As shown in FIG. 1, an optional superheater 12 may be attached to steam piping 11 prior to entry into steam turbine 16. The superheater 12 can be used to add additional heat to the steam from any external heat source 14 including, but not limited to, additional solar heating sources. An optional moisture separator 13 can also be attached to steam piping 11.

Returning to FIG. 2, after powering the steam turbine 16, the steam will exit the turbine 16 and enter a condenser 17 where it will be condensed back into water. The water then is transferred to a heat rejection device 18 such as a cooling tower. The cooled water will then flow back into the steam generator vessel 2 of heat exchanger 4. One or more pumps 19 may act to pump the water back to the heat exchanger 4. In such a manner, the water is ready to again be heated by the pressurized solar loop 1 to form steam inside the heat exchanger 4.

As described above, the pressurized water in pressurized solar loop 1 allows for the water to absorb substantial energy and rise to a temperature well above 100° C. without flashing over to steam. Advantageously, this allows the pressurized solar power system 100 to carry more energy than a two-phase (water/steam) DSG system or a system using a synthetic heat transfer fluid in a non-pressurized solar loop. The enhanced efficiency of the pressurized solar power system 100 described herein also allows for the use of smaller and/or fewer solar collectors than in prior art systems. The efficiency of the pressurized solar power system 100 can be further increased by placing the steam turbine 16 and the heat exchanger 4 in the center of the array of solar collectors, thus reducing the length of piping between the solar collectors and the heat exchanger 4 as well as the length of piping 11 between the heat exchanger 4 and the steam turbine 16.

Figure 3:
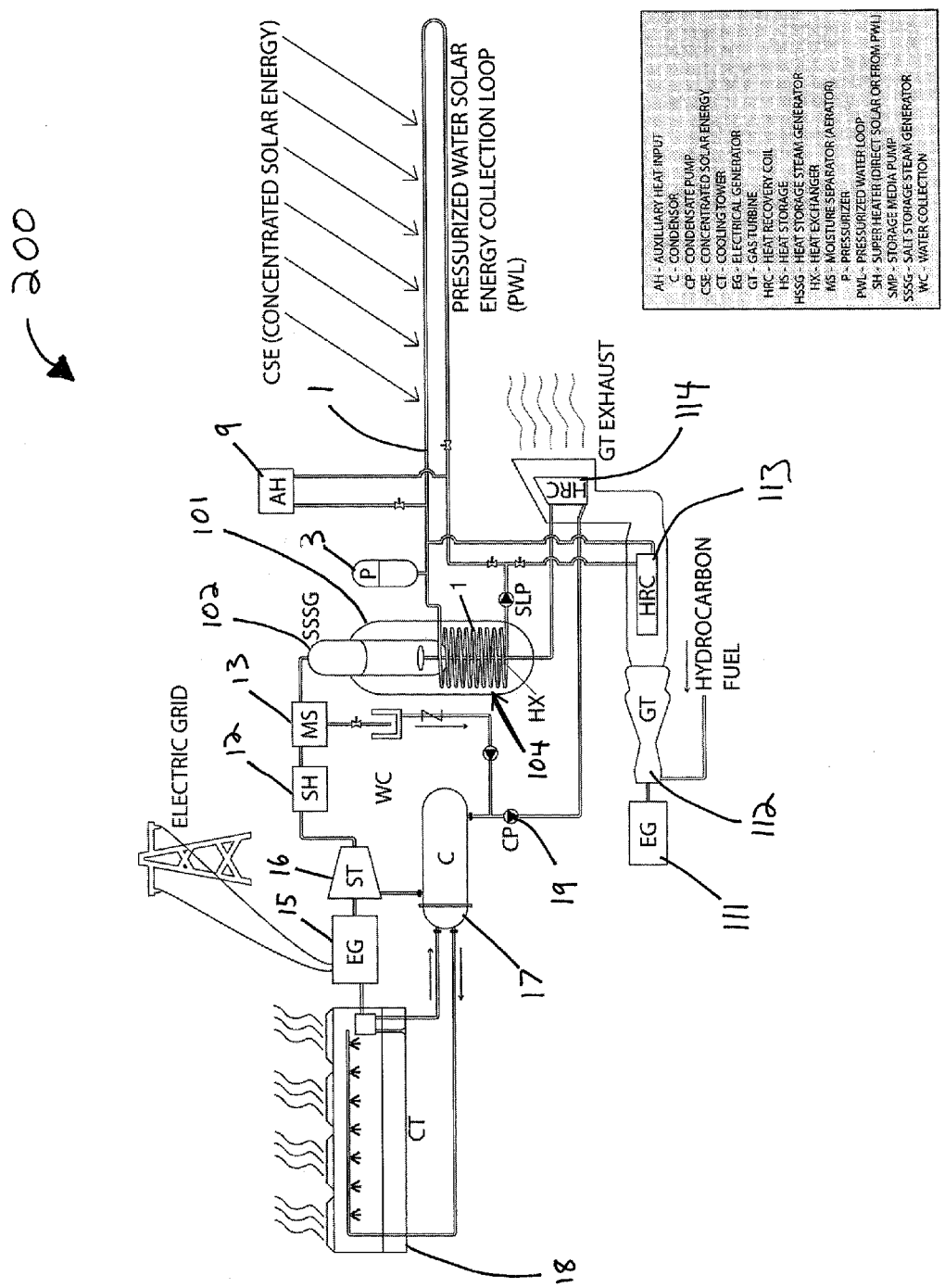
FIG. 3 shows a view of a second embodiment of a pressurized solar power system.

Turning to FIG. 3, a second embodiment of a pressurized solar power system 200 is shown. The embodiment shown in FIG. 3 is similar in many respects to the embodiment shown in FIGS. 1-2, with like reference numerals indicating like parts between the two embodiments. The pressurized solar power system 200 of FIG. 3 generally comprises a pressurized solar loop 1 that preferably contains pressurized water. The pressurized water in solar loop 1 absorbs thermal energy from the concentrated solar energy produced by one or more solar collectors and transports said thermal energy to a heat exchanger 104.

Heat exchanger 104 preferably comprises two vessels: a pressurized steam generator vessel 102 and a non-pressurized storage media vessel 101. The storage media vessel 101 contains a substance suitable for storing and transporting thermal energy such as molten salt. The steam generator vessel 102 contains water in the lower portion of the vessel which, when heated sufficiently, will boil and produce steam in the upper portion of steam generator vessel 102.

A portion of the pressurized solar loop 1 preferably enters the storage media vessel 101 near the lower end of the storage media vessel 101 and forms a coil, loop, or other shape to expose a substantial surface are of the solar loop 1 to the surrounding salt inside the storage media vessel 101. The hot water in the pressurized solar loop 1 advantageously heats the molten salt contained in the storage media vessel 101. In turn, the molten salt is in contact with the exterior portion of steam generator vessel 102 and transfers heat from the molten salt to the steam generator vessel 102. This causes the water inside steam generator vessel 102 to heat up and eventually turn to steam. As described above with respect to FIGS. 1 and 2, the steam can be used to drive a steam turbine 16 and produce electrical energy at an electrical generator 15.

Figure 4:
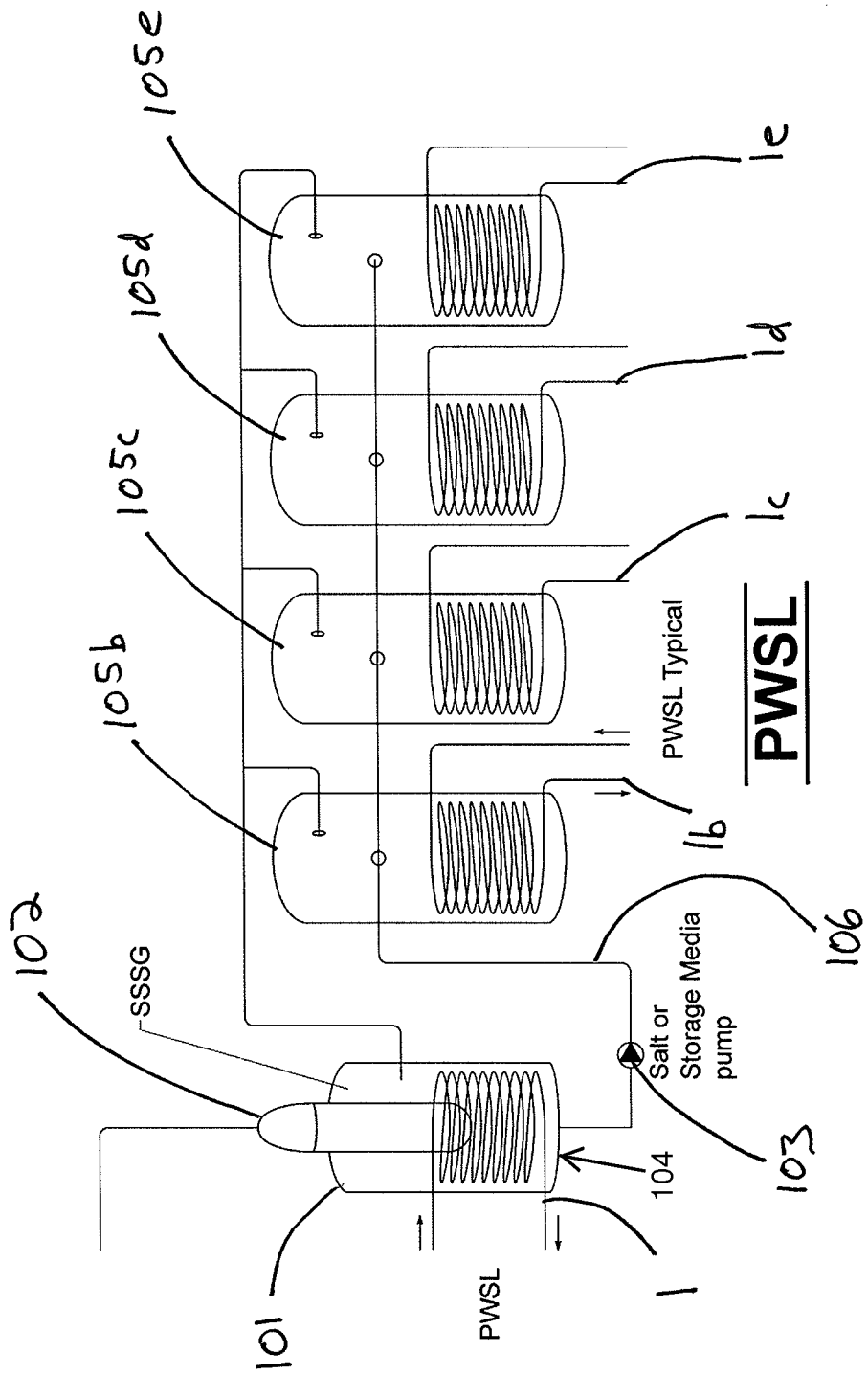
FIG. 4 shows the heat exchanger of FIG. 3 and a plurality of thermal storage tanks for use with the embodiment shown in FIG. 3.

Turning to FIG. 4, a plurality of thermal storage tanks 105b-105e are shown. One or more of such thermal storage tanks 105 may optionally be used in conjunction with the pressurized solar power system 200 of FIG. 3. Advantageously, the thermal storage tanks 105 can be used to store heat energy during the day for use during the night or on cloudy days.

The thermal storage tanks 105 preferably contain molten salt or any other substance suitable for storing heat including, but not limited to, eutectic salts, brines, and graphite. Each storage tank 105b-105e also has disposed therein a portion of a pressurized solar loop 1b-1e. Similar to the pressurized solar loop 1 that heats the molten salt in the heat exchanger 104, the pressurized solar loops 1b-1e are utilized to absorb solar energy as thermal energy, transport that thermal energy to a storage tank 105, and heat the molten salt contained in the storage tank 105. That is, each of the pressurized solar loops 1b-1e are connected at one end of the loop to one or more solar collectors and are connected at the other end of the loop to a storage tank 105. In such a manner, solar energy can be absorbed during a sunny day, converted to thermal energy, and stored in a storage tank 105 for use during the night or on cloudy days.

As shown in FIG. 4, a storage media loop 103 travels from the storage media vessel 101 of heat exchanger 104 to the storage tanks 105. The storage media loop 103 continues from the storage tanks 105 back to the storage media vessel 101. One or more pumps 106 are present along the storage media loop 103 to pump the molten salt. On cloudy days or during the night, hot molten salt from the storage tanks 105 can be pumped into the storage media vessel 101 of heat exchanger 104 to produce steam in steam generator vessel 102. As such, the pressurized solar power system 200 can continue to produce electricity even when there is little or no sunlight.

Returning to FIG. 3, an optional co-generation or combined cycle power generation aspect of the present invention is shown. Specifically, the pressurized solar power systems 100, 200 described herein may be used in conjunction with conventional power generation systems (such as natural gas or coal fired power generation plants) to supplement the power produced by the pressurized solar power system 100, 200. As shown in FIG. 3, hydrocarbon fuel such as natural gas can be used with a conventional gas turbine 112 to power an electrical generator 111. One or more heat recovery coils 113 can advantageously be used to recover waste heat from the gas turbine 112 to heat water in the pressurized solar loop 1. Similarly, one or more heat recovery coils 114 may be used to pre-heat the water before it enters the steam generator vessel 102 of heat exchanger 104.

Turning to FIG. 5, a third embodiment of a pressurized solar power system 300 is shown. The embodiment shown in FIG. 5 is similar to the embodiment shown in FIG. 3, with like reference numerals indicating like parts between the two embodiments. The pressurized solar power system 300 comprises an array of solar collectors (solar array), a pressurized solar loop 1, a heat exchanger 104, a steam turbine 16, and an electric generator 15. The heat exchanger 104 comprises a steam generator vessel 102 and a storage media vessel 101 and functions in a manner similar to the heat exchanger 104 of FIG. 3.

The pressurized solar power system 300 in FIG. 5 is shown operating in conjunction with a geothermal power source 301 and a natural gas source 311. Hot water, steam, natural gas, and/or other carriers from the geothermal power source 301 are directed to a separation tank 302 where natural gas can be separated from the hot water generated by the geothermal power source 301. The natural gas can be directed through pipe 305 to a natural gas pipeline or natural gas storage tank for suitable use, including as a fuel for a conventional gas turbine for use in combined cycle power operations.

After separating the natural gas from the hot water inside separation tank 302, the hot water can be directed through pipe 303 to heat exchanger 104. There, the hot water can supplement the thermal energy produced by the pressurized solar power system 300. After the hot water from the geothermal source 301 has released much of its heat in heat exchanger 104, the water can be injected into the ground through pipe 304.

Advantageously, this injection of water into the ground can be used to bring natural gas to the surface from natural gas source 311. A natural gas well 312 can collect the natural gas and transport it to a separation tank 313. Any water mixed with the natural gas can be removed through pipe 314 and injected into the ground through pipe 304. The recovered natural gas can be collected through pipe 305 and used in any suitable manner, including for combined cycle power operations.

Accordingly, while the invention has been described with reference to the structures and processes disclosed, it is not confined to the details set forth, but is intended to cover such modifications or changes as may fall within the scope of the following claims.

What is claimed is:

1. A pressurized solar power system comprising:
   at least one solar collector;
   a closed loop pipe containing a heat transfer liquid having a boiling temperature at one atmosphere of pressure, wherein said pipe is positioned such that concentrated solar energy from said solar collector is focused on a portion of said pipe thereby heating the transfer liquid to an operating temperature that is above the boiling temperature of the heat transfer liquid at the one atmosphere of pressure;

a sealed bubble pressurizer attached to said pipe and comprising an internal chamber, where vapor of the transfer liquid can form in an upper section of the chamber but cannot be released, thereby self-regulating the vapor pressure of the heat transfer liquid contained in said pipe to maintain the liquid in its liquid state in said pipe; and a heat exchanger;

wherein a portion of said pipe enters said heat exchanger.

2. The pressurized solar power system of claim 1 further comprising:

a steam turbine; and an electrical generator;

wherein said heat exchanger produces steam from thermal energy stored in said heat transfer liquid;

wherein said steam drives said steam turbine; and wherein said steam turbine powers said electrical generator to produce electricity.

3. The pressurized solar power system of claim 1 wherein said heat transfer liquid is water.

4. The pressurized solar power system of claim 1 wherein said heat exchanger comprises a steam generator vessel partially filled with water, and wherein heat from said pipe heats the water in said steam generator vessel to produce steam.

5. The pressurized solar power system of claim 1 wherein said heat exchanger comprises:

a non-pressurized storage media vessel containing a thermal storage medium substance; and a pressurized steam generator vessel partially filled with water;

wherein heat from said pipe heats the thermal storage medium substance and wherein said thermal storage medium substance heats said steam generator vessel.

6. The pressurized solar power system of claim 5 wherein said thermal storage medium substance is a salt.

7. The pressurized solar power system of claim 5 further comprising:

at least one thermal storage tank; and a storage media loop connecting said thermal storage tank to said storage media vessel;

wherein said thermal storage medium substance is capable of travelling from said storage tank to said storage media vessel.

8. A solar power system comprising:

at least one solar collector;

a closed loop pipe containing a heat transfer liquid having a boiling temperature at one atmosphere of pressure, wherein said pipe is positioned such that concentrated solar energy from said solar collector is focused on a portion of the pipe thereby heating the transfer liquid to an operating temperature that is above the boiling temperature of the heat transfer liquid at the one atmosphere of pressure;

a sealed bubble pressurizer attached to said pipe and comprising an internal chamber, where vapor of the transfer liquid can form in an upper section of the chamber but cannot be released, thereby self-regulating the vapor pressure of the heat transfer liquid contained in said pipe to maintain the liquid in its liquid state in said pipe;

a heat exchanger, where a portion of said pipe enters said heat exchanger, and said heat exchanger comprises two vessels, a pressurized steam generator vessel containing water for producing steam and a non-pressurized storage media vessel containing a thermal storage medium substance.

9. The solar power system of claim 8, wherein the portion of the pipe inside the heat exchanger contacts the thermal storage medium substance in the storage media vessel.

10. The solar power system of claim 8, wherein the thermal storage medium substance is salt.

11. The solar powered system of claim 8, wherein the system further includes a thermal storage tank connected to the non-pressurized storage medium vessel so that the thermal storage medium substance can be exchanged between the non-pressurized storage medium vessel and the thermal storage tank.

12. A pressurized solar power system comprising:

at least one solar collector;

a closed loop pipe containing a heat transfer liquid having a boiling temperature at one atmosphere of pressure, wherein said pipe is positioned such that concentrated solar energy from said solar collector is focused on a portion of said pipe thereby heating the transfer liquid to an operating temperature that is above the boiling temperature of the heat transfer liquid at the one atmosphere of pressure;

a sealed bubble pressurizer attached to said pipe and comprising an internal chamber, where vapor of the transfer liquid can form in an upper section of the chamber but cannot be released, thereby self-regulating the vapor pressure of the heat transfer liquid contained in said pipe to maintain the liquid in its liquid state in said pipe;

a non-solar auxiliary heating device connected to the closed loop pipe to directly heat the heat transfer liquid in the closed loop pipe; and a heat exchanger, wherein a portion of said pipe enters said heat exchanger.

13. The pressurized solar power system of claim 12 further comprising:

a) a steam turbine; and b) an electrical generator;

c) wherein said heat exchanger produces steam from thermal energy stored in said heat transfer liquid;

d) wherein said steam drives said steam turbine; and e) wherein said steam turbine powers said electrical generator to produce electricity.

14. The pressurized solar power system of claim 12 wherein said heat transfer liquid is water.

15. The pressurized solar power system of claim 12 wherein said heat exchanger comprises a steam generator vessel partially filled with water, and wherein heat from said pipe heats the water in said steam generator vessel to produce steam.

16. The pressurized solar power system of claim 12 wherein said heat exchanger comprises:

a) a non-pressurized storage media vessel containing a thermal storage medium substance; and b) a pressurized steam generator vessel partially filled with water;

c) wherein heat from said pipe heats the thermal storage medium substance and wherein said thermal storage medium substance heats said steam generator vessel.

17. The pressurized solar power system of claim 16 wherein said thermal storage medium substance is a salt.

18. The pressurized solar power system of claim 16 further comprising:
a) at least one thermal storage tank; and
b) a storage media loop connecting said thermal storage tank to said storage media vessel;
c) wherein said thermal storage medium substance is capable of travelling from said storage tank to said storage media vessel.

19. A solar power system comprising:
at least one solar collector;
a closed loop pipe containing a heat transfer liquid having a boiling temperature at one atmosphere of pressure, wherein said pipe is positioned such that concentrated solar energy from said solar collector is focused on a portion of the pipe thereby heating the transfer liquid to an operating temperature that is above the boiling temperature of the heat transfer liquid at the one atmosphere of pressure;
a sealed bubble pressurizer attached to said pipe and comprising an internal chamber, where vapor of the transfer liquid can form in an upper section of the chamber but cannot be released, thereby self-regulating the vapor pressure of the heat transfer liquid contained in said pipe to maintain the liquid in its liquid state in said pipe;
non-solar auxiliary heating device connected to the closed loop pipe to directly heat the heat transfer liquid in the closed loop pipe;
a heat exchanger, where a portion of said pipe enters said heat exchanger, and said heat exchanger comprises two vessels, a pressurized steam generator vessel containing water for producing steam and a non-pressurized storage media vessel containing a thermal storage medium substance.

20. The solar power system of claim 19, wherein the portion of the pipe inside the heat exchanger contacts the thermal storage medium substance in the storage media vessel.

21. The solar power system of claim 19, wherein the thermal storage medium substance is salt.

22. The solar powered system of claim 19, wherein the system further includes a thermal storage tank connected to the non-pressurized storage medium vessel so that the thermal storage medium substance can be exchanged between the non-pressurized storage medium vessel and the thermal storage tank.

* * * * *